(12) United States Patent
Jaradi et al.

(10) Patent No.: US 9,713,998 B2
(45) Date of Patent: Jul. 25, 2017

(54) CORRUGATED PASSENGER AIRBAG

(71) Applicant: FORD GLOBAL TECHNOLOGIES, LLC, Dearborn, MI (US)

(72) Inventors: Dean M. Jaradi, Macomb, MI (US); Mohammed Omar Faruque, Ann Arbor, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/260,680

(22) Filed: Apr. 24, 2014

(65) Prior Publication Data

US 2015/0307052 A1 Oct. 29, 2015

(51) Int. Cl.
*B60R 21/231* (2011.01)
*B60R 21/2338* (2011.01)
*B60R 21/00* (2006.01)

(52) U.S. Cl.
CPC ........ *B60R 21/231* (2013.01); *B60R 21/2338* (2013.01); *B60R 2021/0048* (2013.01); *B60R 2021/23382* (2013.01)

(58) Field of Classification Search
CPC .............. B60R 21/231; B60R 21/2338; B60R 2021/23382; B60R 2021/0048
USPC .................................. 280/743.2, 743.1, 732
See application file for complete search history.

(56) References Cited

U.S. PATENT DOCUMENTS

| | | | | |
|---|---|---|---|---|
| 5,022,675 A | * | 6/1991 | Zelenak et al. | 280/743.1 |
| 5,044,663 A | * | 9/1991 | Seizert | 280/730.1 |
| 5,213,361 A | * | 5/1993 | Satoh et al. | 280/730.1 |
| 5,380,038 A | * | 1/1995 | Hawthorn et al. | 280/730.1 |
| 6,254,130 B1 | | 7/2001 | Jayaraman et al. | |
| 6,616,184 B2 | * | 9/2003 | Fischer | 280/743.2 |
| 6,962,363 B2 | | 11/2005 | Wang et al. | |
| 6,981,719 B2 | * | 1/2006 | Igawa | 280/743.2 |
| 7,334,812 B2 | | 2/2008 | Abe | |
| 7,377,548 B2 | * | 5/2008 | Bauer et al. | 280/743.2 |
| 7,571,931 B2 | | 8/2009 | Watanabe | |
| 8,215,671 B2 | * | 7/2012 | Bergstrom et al. | 280/743.2 |

(Continued)

FOREIGN PATENT DOCUMENTS

| | | | | |
|---|---|---|---|---|
| CA | 2361732 A1 | * | 4/2003 | ......... B60R 21/231 |
| DE | 102004011369 A1 | | 3/2004 | |

(Continued)

OTHER PUBLICATIONS

Sherwood, Chris, "An Update on the IIHS Small Overlap Research Program", SAE International, 2012 Government/Industry Meeting, Jan. 25, 2012, Washington, DC, Insurance Institute for Highway Safety, Highway Loss Data Institute.

*Primary Examiner* — Paul N Dickson
*Assistant Examiner* — Joselynn Y Sliteris
(74) *Attorney, Agent, or Firm* — Frank A. MacKenzie; Brooks Kushman P.C.

(57) ABSTRACT

An airbag system includes an airbag. The airbag includes a face portion configured such that when the airbag is inflated; the face portion forms a corrugated section. The corrugated section has a plurality of corrugations. The plurality of corrugations is configured to impede movement of an occupant's head from a center of the airbag toward a side of the airbag during impact. The plurality of corrugations is formed using a plurality of tethers attached to the face portion.

11 Claims, 2 Drawing Sheets

(56) References Cited

U.S. PATENT DOCUMENTS

| | | | |
|---|---|---|---|
| 8,419,053 B2 * | 4/2013 | Ahn | 280/732 |
| 8,544,882 B2 * | 10/2013 | Gulde et al. | 280/732 |
| 2003/0116945 A1 | 6/2003 | Abe | |
| 2005/0098994 A1 | 5/2005 | Matsumura | |
| 2005/0110257 A1 * | 5/2005 | Cohen | 280/743.1 |
| 2006/0103118 A1 * | 5/2006 | Hasebe | 280/729 |
| 2006/0163848 A1 | 7/2006 | Abe | |
| 2006/0186656 A1 * | 8/2006 | Kumagai | 280/743.2 |
| 2009/0179404 A1 | 7/2009 | Peyre et al. | |

FOREIGN PATENT DOCUMENTS

| | | | | |
|---|---|---|---|---|
| EP | 1439096 A1 * | 7/2004 | | B60R 21/231 |
| GB | 2415665 A | 1/2006 | | |
| JP | 02303951 A | 12/1990 | | |
| JP | 03032956 A | 3/1991 | | |
| JP | 08324373 A | 12/1996 | | |
| JP | 2006088856 A | 6/2006 | | |
| JP | 2006256508 A | 9/2006 | | |
| JP | 2009214872 A | 9/2009 | | |
| JP | 2010241241 A | 10/2010 | | |
| KR | 20120043551 | 5/2012 | | |

* cited by examiner

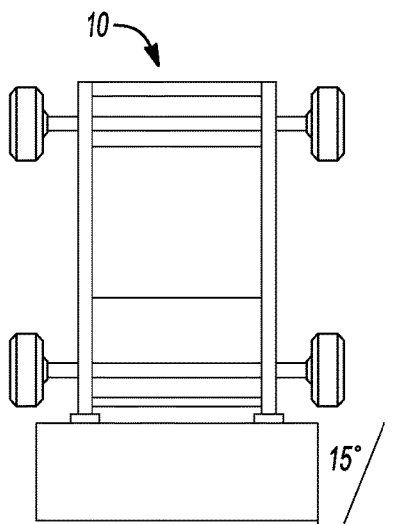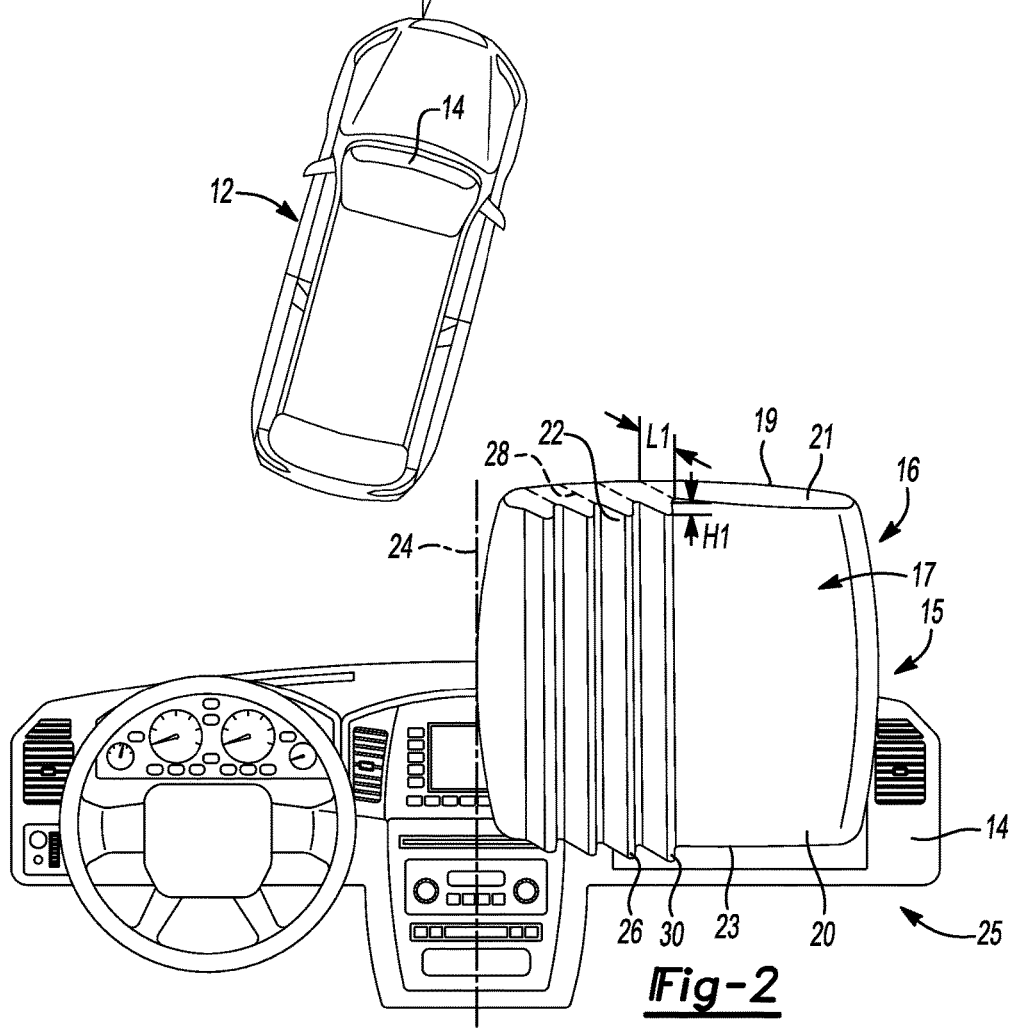

CORRUGATED PASSENGER AIRBAG

TECHNICAL FIELD

The present application relates to passenger side airbags for vehicles.

BACKGROUND

Traditionally, airbags are deployed upon impact. Airbags fill with gas and cushion vehicle occupants as they are displaced within the vehicle. They are also designed to absorb energy generated by the displacement of the occupants.

SUMMARY

An airbag system includes an airbag. The airbag includes a face portion configured such that when the airbag is inflated; the face portion forms a corrugated section. The corrugated section has a plurality of corrugations. The plurality of corrugations is configured to impede movement of an occupant's head from a center of the airbag toward a side of the airbag during impact.

A vehicle includes an instrument panel and an airbag module. The airbag module includes an airbag and an inflator disposed behind the instrument panel. The airbag defines, when inflated, a single chamber having a plurality of corrugations formed on an occupant receiving section of the airbag adjacent to a center of the vehicle. The plurality of corrugations is configured to impede movement of an occupant's head across the occupant receiving section during impact of the vehicle.

A vehicle airbag module includes an inflator, an airbag having a face portion, and a plurality of tethers. The plurality of tethers is attached to the face portion and arranged to form a corrugated section on the face portion adjacent a side of the airbag upon inflation of the airbag.

BRIEF DESCRIPTION OF THE DRAWINGS

FIG. 1 is a top view of a vehicle about to experience an oblique impact;

FIG. 2 is a front view of a deployed passenger side airbag; and

DETAILED DESCRIPTION

Figures 3, 4, 5:
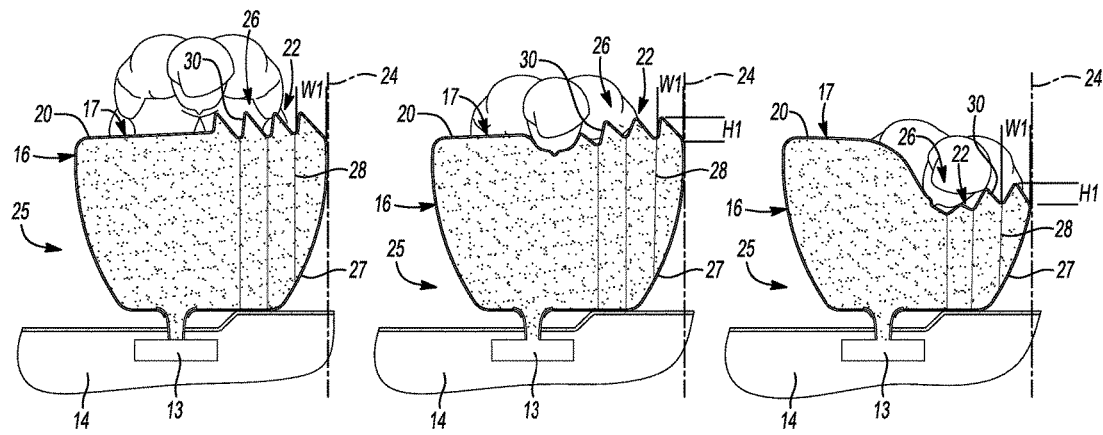
FIGS. 3 through 5 are top views of a vehicle occupant moving toward and into a deployed airbag arrangement during an oblique impact.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Airbags aid in protecting vehicle occupants during an impact. Impacts may occur in many different ways. Forces from an impact with a vehicle displace an occupant's body. Different impacts displace vehicle occupants in different directions. The displacement of the occupant's body causes the occupant to move toward rigid regions of the interior of the vehicle. As the occupant moves toward the rigid region, the airbag acts as a cushion absorbing energy, generated by the force of the impact, from the occupant. For example, an oblique impact—an impact at an angle of approximately 15°—may cause a vehicle occupant, or more specifically a passenger, to have a forward angular inertia moving toward the center of the vehicle interior.

Referring to FIG. 1, an oblique impact between vehicles is shown. Oblique impacts are impacts that occur at an angle, generally at approximately 15°. A first vehicle 10 is shown impacting a second vehicle 12. The impact between the first vehicle 10 and the second vehicle 12 generates an inertial force displacing a vehicle occupant. During an oblique impact, the occupant is displaced and has a forward angular inertia. In the case of a vehicle passenger, the forward angular inertia moves the occupant toward the center of the instrument panel 14 of the vehicle interior.

Referring to FIG. 2, a passenger airbag module 15 of the present disclosure is shown. The airbag module 15 includes an airbag 16 disposed behind the instrument panel 14. The airbag 16 is deployed on a passenger side 25 of the vehicle. The airbag 16 has a face 17 and a back 19. The face 17 of the airbag 16 has two sections, an occupant receiving section 20 and a corrugated section 22.

The corrugated section 22 and the occupant receiving section 20 form the face 17 of the airbag 16. A plurality of corrugations 26 forms the corrugated section 22. The plurality of corrugations 26 may extend between a top 21 and a bottom 23 of the airbag 16. While preferred, this is merely an example. The plurality of corrugations 26 may also be formed in a way such that they optimally slow the lateral sliding motion of the occupant's head. For example, the plurality of corrugations may further be formed at a distance offset from the top 21 and the bottom 23 of the airbag 16.

The occupant receiving section 20 initially receives the occupant after an oblique impact. Due to the forward rotational inertia of the occupant, the occupant may have a tendency to slide across the occupant receiving section 20. As the occupant slides across the occupant receiving section 20 of the airbag 16, the occupant contacts the corrugated section 22. Disposed adjacent a center 24 of the vehicle, the corrugated section 22 uses a plurality of corrugations 26 to impede the forward angular motion of the occupant generated by an oblique impact.

The plurality of corrugations 26 may include at least three corrugations 30 and may be formed on the face 17 of the airbag 16. The plurality of corrugations 26 may be formed by design, stitching, or tethering. For example, a plurality of tethers 28 may extend between the face 17 and the back 19 of the airbag. The tether length L1 defines the height H1 of the plurality of corrugations 26. The tether length L1 may be optimized to sufficiently slow an occupant's forward angular motion and head rotation.

In another example, the plurality of corrugations 26 may be accomplished using stitching techniques. In this example, the height H1 of the corrugations 26 may be formed by design and may also be optimized to slow an occupant's forward rotational motion. The plurality of corrugations 26 do not need to have a constant height H1. The height H1 of each of the plurality of corrugations 26 may vary. For example, the plurality of corrugations 26 may ascend toward a center 24 of the vehicle. In another example, the plurality of corrugations 26 may follow an alternating height design in which a pattern, such as an initial longer corrugation 26 followed by a shorter corrugation 26, is designed on the corrugated section 22.

FIGS. 3, 4, and 5 depict a top view of occupant movement, after an oblique impact, into the airbag 16. Initially upon impact, the occupant moves forward and contacts the occupant receiving section 20 on the face 17 of the airbag 16. As the occupant's body begins to move, the occupant's head begins to engage the corrugated section 22. The corrugated section 22 is designed to have a plurality of formed corrugations 26 configured to impede the movement of the occupant's head towards the center 24 of the vehicle.

Referring to FIG. 3, an occupant is shown sliding forward into the occupant receiving section 20 of the airbag 16. Upon impact, an inflator 13 disposed behind the instrument panel 14 inflates the airbag 16 as the occupant slides forward. This causes the occupant to engage the occupant receiving section 20 of the airbag 16, allowing the occupant receiving section 20 to act as a traditional airbag used during a full frontal collision. The occupant receiving section 20 catches the occupant acting like a pillow to cushion the occupant as they slide forward.

The airbag 16 may define a single chamber. Using a single chamber may be advantageous because the volume and the pressure of the airbag 16 will not be substantially affected by the plurality of corrugations 26. The plurality of corrugations 26 does not substantially increase or decrease the volume or the pressure of the airbag 16. This reduces recalibration time and allows the airbag module 15 to use a traditional inflator 13. Further, since the corrugated section 22 is adjacent the occupant receiving section 20 on the face 17 of the airbag 16, the airbag 16 may be used without impacting occupant performance in a full frontal impact. This may save time, cost, and manufacturing expenses.

The airbag 16 may, however, also use a two or three chamber design. For example, in the two chamber design, the occupant receiving section 20 may be a single chamber and the corrugated section 22 may be another chamber. This may change the volume and pressure in each chamber and require recalibration. Further, in the two or three chamber design, an additional or different inflator 13 may be used.

During an oblique impact, an occupant on a passenger side 25 of the vehicle has a tendency to slide toward the center 24 of the vehicle. This may cause the occupant's head to slide across the occupant receiving portion 20 of the airbag 16 in the direction of the impact. After the occupant receiving portion 20 catches the occupant and the occupant slides across the occupant receiving portion 20 on the face 17 of the airbag 16, the occupant contacts the corrugated section 22 of the face 17 of the airbag 16.

Referring to FIG. 4, an occupant is shown sliding across the occupant receiving section 20 and contacting the corrugated section 22. The corrugated section 22 is disposed adjacent the occupant receiving section 20 on the face 17 of the airbag 16, adjacent a center 24 of the vehicle. The corrugated section 22 is configured to further slow the occupant as the occupant begins to slide across the face 17 of the airbag 16. After contacting the corrugated section 22, the lateral sliding of the occupant's head will slow. Slowing the lateral sliding of the occupant's head allows the airbag 16 to further cushion an occupant during impact. The corrugated section 22 uses the plurality of corrugations 26 to impede the movement of the occupant's head across the face 17 of the airbag 16 during impact.

Disposed proximate the center 24 of the vehicle and adjacent a side 27 of the airbag 16, the plurality of corrugations 26 may slant generally toward the occupant. This allows the plurality of corrugations 26 to further absorb the energy of the occupant after impact. When the occupant contacts the plurality of corrugations and begins to slide across the corrugated section 22, the plurality of corrugations 26 act with a frictional force impeding the lateral sliding of the occupant. This slows the occupant's forward angular motion and allows the face 17 of the airbag 16 to further cushion the occupant.

The plurality of corrugations 26 further act as a pillow to further cushion the occupant and are further configured to hinder the lateral sliding force of the occupant's head across the face 17 of the airbag 16. The corrugated section 22 may include at least three corrugations 30. The plurality of corrugations 26 may vary in height, width, and depth. For example, the plurality of corrugations 26 may ascend in height H1 and increase in width W1 as the corrugated section 22 approaches the center 24 of the vehicle. The plurality of corrugations 26 are further configured to impede movement of the occupant's head during impact using a design in which contact with each corrugation 26 absorbs some of the occupant's forward rotational inertia.

For example, the plurality of corrugations 26 may be slanted away from the center 24 of the vehicle toward the passenger side 25 of the vehicle. The plurality of corrugations 26 may be slanted in a way such that they oppose the lateral sliding of the occupant's head across the face 17 of the airbag 16. During impact, the occupant will continuously engage the plurality of corrugations 26 on the corrugated section 22 until the lateral sliding force of the occupant's head generated by the forward angular motion sufficiently slows to further maintain contact with the airbag 16.

Referring to FIG. 5, a top view of an occupant sliding across the corrugated section 22 on the face 17 of the airbag 16 is shown. The corrugated section 22 slows the occupant's head from sliding across the face 17 of the airbag 16 through successive encounters with the plurality of corrugations 26. As the occupant's head slides into the corrugated section 22, the occupant contacts the plurality of corrugations 26. The plurality of corrugations 26 are formed by successive intervals of single corrugations 30. A single corrugation 30 opposes the movement of the occupant's head across the corrugated section 22 slowing the sliding motion of the occupant's head across the face 17 of the airbag 16.

As the occupant's head continues to slide towards the center 24 of the vehicle and after the occupant's head contacts an initial corrugation 30, the occupant's head contacts another corrugation 30. The corrugation 30 further slows the sliding motion of the occupant's head across the face 17 of the airbag 16. If the occupant's head continues to slide across the corrugated section 22, then the occupant's head will contact yet another single corrugation 30. Again, this corrugation 30 will slow the sliding motion of the occupant's head across the corrugated section of 22. This successive encountering of the individual corrugations 30 allows the corrugated section 22 to further cushion an occupant after impact.

Successively encountering a plurality of corrugations 26 impedes the movement of the occupant during impact to further prevent the occupant from sliding on the face 17 of the airbag 16. The number and pattern of the corrugations 30 may vary. The corrugated section 22 may be comprised of any number of individual corrugations 30 and those corrugations 30 may have any optimal pattern for slowing the occupant's head. For example, the plurality of corrugations 26 may be comprised of two or more single corrugations 30 arranged symmetrically.

In another example, the plurality of corrugations 26 may be comprised of four or more single corrugations 30 arranged with alternating widths W1 and heights H1. The dimensions, number, and arrangement of the plurality of corrugations 26 may vary to achieve optimal slowing of the occupant's head across the corrugated section 22 on the face 17 of the airbag 16. This allows the airbag 16 to further support an occupant after an oblique impact.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An airbag system comprising:
    an airbag including a plurality of tethers and a face arranged such that when the airbag is inflated, the face forms a plurality of corrugations disposed between a center of the face and a side of the airbag, each corrugation defining two sides and a peak slanted away from a vehicle center to impede occupant head movement from the center of the face toward the side of the airbag during impact.

2. The airbag system of claim 1 wherein each of the corrugations extends between a top and bottom of the airbag.

3. The airbag system of claim 1 wherein the plurality of corrugations includes at least three corrugations.

4. The airbag system of claim 1 wherein the plurality of corrugations vary in height.

5. The airbag system of claim 1 wherein the plurality of corrugations vary in width.

6. The airbag system of claim 1 wherein the airbag defines a single chamber.

7. A vehicle comprising:
    an instrument panel; and
    an airbag module including an airbag and an inflator disposed behind the instrument panel, the airbag defining, when inflated, a single chamber having a plurality of corrugations disposed between a center of a face of the airbag and a side of the face of the airbag, adjacent to a center of the vehicle, each corrugation having two sides and a peak portion formed with a slant away from the center of the vehicle and toward a passenger side, each corrugation configured to impede movement of an occupant's head across the face of the airbag during impact of the vehicle.

8. The vehicle of claim 7 wherein the airbag module further includes a plurality of tethers extending between a portion of the face and a back of the airbag to form the plurality of corrugations.

9. The vehicle of claim 8 wherein the airbag has an untethered portion on the face, the untethered portion disposed proximate a passenger side of the vehicle.

10. The vehicle of claim 7 wherein the plurality of corrugations vary in height.

11. The vehicle of claim 7 wherein the plurality of corrugations vary in width.

* * * * *